July 18, 1961
P. SIMONINI
2,992,839
ADJUSTABLE AND REPLACEABLE CONDUIT COUPLING
Filed July 14, 1954
FIG. 1
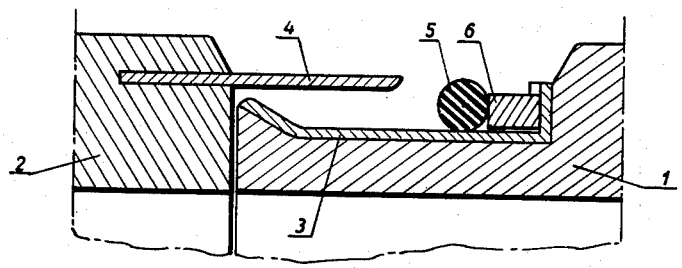
FIG. 2
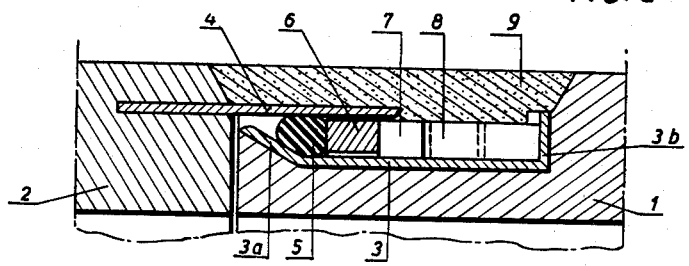
FIG. 3
FIG. 4
FIG. 5
INVENTOR.
PIETRO SIMONINI
BY
Knight Bros.
Attorneys

United States Patent Office 2,992,839
Patented July 18, 1961

2,992,839
ADJUSTABLE AND REPLACEABLE CONDUIT COUPLING
Pietro Simonini, Milan, Italy, assignor of part interest to Tubi Bonna S.p.A., a corporation of Italy
Filed July 14, 1954, Ser. No. 443,339
Claims priority, application Italy July 29, 1953
3 Claims. (Cl. 285—288)

The present invention relates to couplings or joints for conduits in general, and particularly for reinforced concrete pipe and the like in which an elastic coupling is formed by means of a single packing ring, made of rubber or other suitable material, which is mechanically pressed in between the ends of the pipes.

Different kinds of joints with a single rubber ring are known, particularly for reinforced concrete pipe or the like. All these joints have, however, several drawbacks: for example, as the rubber ring is pressed into its final position at the moment and as a consequence of the coupling, it is generally not possible accurately to control the position of the ring itself, so that the coupling operation is always rather troublesome and especially difficult when the pipe has a large diameter and considerable weight.

Furthermore, once the connection is made, the rubber ring is out of reach and it is impossible therefore to work on it if the testing should show that it leaks. Finally, with these types of joints, it is not possible to remove and replace the rubber ring without removing the whole pipe. This makes necessary the burdensome work of testing each joint separately, at the moment of making the coupling, as it is difficult to eliminate any defect that may appear thereafter.

The joint or coupling of the present invention has the advantages common to all couplings with a single rubber ring, namely:

(1) It allows relative longitudinal sliding of the pipes to compensate for thermal changes.

(2) It allows small angular relative displacements of the pipes, caused, for instance, by settling of the ground on which the pipe is laid.

(3) It allows execution of planimetric curves of small width and long radius, without the use of special fittings.

In addition, the present invention has the following advantages:

(4) The packing ring is not fitted and pressed at the moment of slipping the pipe ends into each other but only after this latter has taken place; therefore the arranging of the pipes doesn't require special attention, such as is required for couplings with rubber rings of the "Lock Joint" and similar types.

(5) The pressure against the packing ring of the present coupling can be adjusted after the pipe is installed, by means of suitable wedges, i.e. wedge blocks (as will be explained below); the packing ring can therefore be pressed further on with a pressure stronger than the initial pressure in order quickly to eliminate any occasional leaks that may appear in a joint when testing, and without any damage to the pipe.

(6) The joint, which is the object of the present invention, can be easily detached or disconnected if the pipe line has to be dismantled. The packing ring can, if necessary, be easily replaced without any displacement of the installed pipe, and this results in considerable technical and economical advantage.

According to the invention, the adjacent ends of the two pieces of pipe to be coupled or joined are provided with complementary ring members one of which encircles or surrounds the other but with a space left in between. The inner ring member is so formed with respect to the encircling ring member as to restrict the spacing adjacent the end of the inner ring member. A packing ring is forced tightly into the space against the walls of the restricted portion by means of a pressure ring, and means is provided for pressing and holding said pressure ring tight against said packing. All said parts are located in a recess in the pipe; the sealing parts are readily adjustable and replaceable; and the recess may be filled with removable material so as to conform the outer contour to the pipe contour and at the same time to permit ready access to the coupling if desired.

The invention will now be described with reference to the accompanying drawing in which, FIG. 1 is a view showing the coupling parts in longitudinal section, and in position prior to the time the packing ring and pressure ring are moved into position to seal the joint;

FIG. 2 is a similar view showing the coupling parts in sealing position;

FIG. 3 is a top plan view at right angles to FIG. 2; while

FIGS. 4 and 5 illustrate different cross-sectional shapes that may be used for the pressure ring.

In said drawings, the numerals 1 and 2 designate respectively sections of pipe to be joined to each other. A metallic ring 3 is secured to one end of pipe section 1 in a recessed portion of the latter. A complementary metallic ring 4 is secured to the adjacent end of pipe section 2. This ring 4 is of a greater internal diameter than the external diameter of ring 3 and a portion of it encircles ring 3 in such manner as to leave a space inbetween for the insertion of the packing ring 5. This packing ring 5 is made of rubber or other suitable material. Ring 3 is flared or otherwise shaped at the end 3a so as to restrict the space between the rings 3 and 4 at such point in order to limit the movement of packing ring 5 in that direction. At the other end the ring 3 is provided with an outwardly extending or peripheral flange 3b.

The numeral 6 designates a pressure ring of metal or other hard material which is of such size and shape as to be slidable in the space between rings 3 and 4 in order to press and seal the packing ring 5 tightly against the walls in the restricted portion of the space. The cross-sectional shape of the pressure ring 6 need not be rectangular as shown in FIGS. 1 and 2, but may be shaped as shown at 6a and 6b in FIGS. 4 and 5 respectively.

Means for forcing and holding the pressure ring 6 tight against the packing ring 5 have been provided in the form of a pair of complementary wedge members 7 and 8. One of the members 8 engages the flange 3b while the other engages the pressure ring 6. As many pairs of wedge members may be used as are needed, and usually the greater the pipe bore the greater the number used.

In assembling the coupling or joint, the packing ring 5 and the pressure ring 6 are slipped over the ring 3; the pipe sections are aligned; and ring 3 is moved into ring 4 (see FIG. 1).

The packing ring 5 and pressure ring 6 are then pushed by hand or by means of any suitable device into the space between rings 3 and 4.

Next a series of wedge devices 7, 8 are placed between flange 3b and pressure ring 6. The wedging action of each of the wedge devices is then increased until the desired pressure on the pressure ring 6 is reached.

The recess in the pipe in which all the coupling parts are located is then filled in with removable material 9 so as to conform the outer contour to the general contour of the pipe section and at the same time to permit ready access to the pipe coupling if desired.

As will be apparent, the construction according to the present invention is such that it is possible, without the necessity of removing or changing the alignment of the pipe sections, to remove the filling material 9 and then adjust or remove and replace the sealing parts of the coupling.

I claim:

1. A structure comprising two concrete pipe sections, an outer metal ring secured, adjacent one end thereof, to one of the said sections, an inner metal ring of lesser diameter than the first ring secured, adjacent one end thereof, to the other pipe section, both rings extending longitudinally of the pipe sections and having outer diameters substantially less than that of their respective pipe sections to provide an annular recess, the inner ring having its other end portion extending within and spaced radially from the outer ring, said other end portion having an outwardly flaring tapering surface to cause a reduced spacing from the encircling outer ring, said structure providing a transverse abutment surface adjacent the secured rearward end portion of the inner ring, a resilient packing ring encircling the inner ring, a pressing ring encircling the inner ring and insertable under the outer metal ring, wedge block means between the abutment surface and the pressing ring and bearing between and against the abutment surface and the pressing ring to push the pressing ring forwardly under the outer metal ring and to thereby push the resilient packing ring at least in part into said reduced spacing, the rearward longitudinal thrust of the wedge means against the abutment surface being borne by the said other concrete pipe section, the outer ring being spaced longitudinally from the secured end portion of the inner ring to permit access to the wedge, the said annular recess being filled with filling material to form the outer contour of the pipe at the region of the recess.

2. A structure comprising two concrete pipe sections, an outer metal ring secured, adjacent one end thereof, to one of the said sections, an inner metal ring of lesser diameter than the first ring secured, adjacent one end thereof, to the other pipe section, both rings extending longitudinally of the pipe sections and having outer diameters substantially less than that of their respective pipe sections to provide an annular recess, the inner ring having its other end portion extending within and spaced radially from the outer ring, said other end portion having an outwardly flaring tapering surface to cause a reduced spacing from the encircling outer ring, the outer ring being spaced longitudinally from the secured end portion of the inner ring, an abutment surface comprising an outwardly extending flange formed on the secured end of the inner ring, the flange resting against and being supported by the respective concrete pipe section, a resilient packing ring encircling the inner ring, a pressing ring encircling the inner ring and insertable under the outer metal ring, wedge block means bearing force between the abutment surface and the pressing ring to push the pressing ring under the outer metal ring to thereby push the resilient packing ring at least in part into said reduced spacing, the said annular recess being filled with filling material to form the outer contour of the pipe at the region of the recess.

3. The structure defined in claim 2, the wedge block means comprising pairs of opposed wedges.

References Cited in the file of this patent

UNITED STATES PATENTS

| | | |
|---|---|---|
| 635,534 | Florin | Oct. 24, 1899 |
| 1,292,060 | Richards | Jan. 21, 1919 |
| 1,396,135 | Meriwether | Nov. 8, 1921 |
| 1,474,437 | McWane | Nov. 20, 1923 |
| 1,652,418 | Sherrerd | Dec. 13, 1927 |
| 1,662,311 | Hamer | Mar. 13, 1928 |
| 1,976,589 | Trickey | Oct. 9, 1934 |
| 2,084,466 | Ukropina | June 22, 1937 |
| 2,226,067 | Morgan | Dec. 24, 1940 |

FOREIGN PATENTS

| | | |
|---|---|---|
| 43,583 | Netherlands | July 15, 1938 |
| 904,880 | France | Nov. 19, 1945 |